(12) United States Patent
Ergang et al.

(10) Patent No.: US 8,377,194 B2
(45) Date of Patent: Feb. 19, 2013

(54) SULFUR CONTAINING SILICA PARTICLE

(75) Inventors: Nicholas S. Ergang, Glen Ellyn, IL (US); Ian Saratovsky, Highland Park, IL (US); Hung-Ting Chen, Naperville, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/242,618

(22) Filed: Sep. 23, 2011

(65) Prior Publication Data

US 2012/0245025 A1    Sep. 27, 2012

Related U.S. Application Data

(63) Continuation-in-part of application No. 12/756,577, filed on Apr. 8, 2010, now Pat. No. 8,025,726, and a continuation-in-part of application No. 12/756,526, filed on Apr. 8, 2010.

(51) Int. Cl.
C01B 33/00 (2006.01)
C01B 33/113 (2006.01)
C01B 17/00 (2006.01)
C09D 1/00 (2006.01)

(52) U.S. Cl. .......... 106/481; 106/286.1; 106/287.1; 106/287.32; 106/401; 106/403; 106/404; 106/419; 106/430; 106/431; 106/436; 106/438; 106/439; 106/440; 106/442; 106/452; 106/457; 106/461; 106/480; 106/482; 106/483; 106/484; 106/490; 106/491; 423/326; 423/327.1; 423/331

(58) Field of Classification Search .......... 106/401, 106/403, 404, 419, 430, 431, 436, 438, 439, 106/440, 442, 452, 457, 461, 480, 483, 484, 106/490, 491, 286.1, 287.1, 287.32, 481, 106/482; 423/326, 327.1, 331
See application file for complete search history.

(56) References Cited

U.S. PATENT DOCUMENTS

| | | | |
|---|---|---|---|
| 4,272,409 A | 6/1981 | Bergna | |
| 4,474,896 A | 10/1984 | Chao | |
| 4,612,138 A | 9/1986 | Keiser et al. | |
| 4,927,498 A | 5/1990 | Rushmere | |
| 5,164,095 A | 11/1992 | Sparapany et al. | |
| 5,196,177 A | 3/1993 | Watanabe et al. | |
| 5,346,627 A | 9/1994 | Siefert et al. | |
| 5,378,399 A | 1/1995 | Kaliski | |
| 5,503,820 A | 4/1996 | Moffett et al. | |
| 5,980,836 A | 11/1999 | Moffett et al. | |
| 6,060,523 A | 5/2000 | Moffett et al. | |
| 6,077,341 A | 6/2000 | Terase et al. | |
| 6,274,112 B1 | 8/2001 | Moffett et al. | |
| 6,326,326 B1 | 12/2001 | Feng et al. | |
| 6,372,806 B1 | 4/2002 | Keiser et al. | |
| 6,531,224 B1 | 3/2003 | Fryxell et al. | |
| 6,548,149 B1 | 4/2003 | Liu et al. | |
| 6,569,908 B2 | 5/2003 | Noguchi et al. | |
| 6,632,489 B1 | 10/2003 | Watanabe et al. | |
| 6,673,208 B2 | 1/2004 | Persson et al. | |
| 6,723,426 B2 | 4/2004 | Fryxell et al. | |
| 6,749,825 B2 | 6/2004 | Fryxell et al. | |
| 6,752,864 B2 | 6/2004 | Meyer et al. | |
| 6,808,768 B2 | 10/2004 | Satou et al. | |
| 6,916,943 B2 | 7/2005 | Addiego et al. | |
| 7,156,955 B2 | 1/2007 | Nyander et al. | |
| 7,250,148 B2 | 7/2007 | Yang et al. | |
| 7,438,875 B2 | 10/2008 | Do et al. | |
| 7,504,084 B2 | 3/2009 | Simmons et al. | |
| 7,550,060 B2 | 6/2009 | Jacobson et al. | |
| 7,553,547 B2 | 6/2009 | Fryxell et al. | |
| 7,588,798 B2 | 9/2009 | Alford et al. | |
| 7,628,844 B2 | 12/2009 | Hua | |
| 7,629,392 B2 | 12/2009 | Nyander et al. | |
| 7,662,306 B2 | 2/2010 | Persson et al. | |
| 8,025,726 B1 * | 9/2011 | Keiser et al. .................. 106/482 |
| 2005/0084438 A1 | 4/2005 | Do et al. | |
| 2005/0170109 A1 | 8/2005 | Chen et al. | |
| 2006/0078696 A1 | 4/2006 | Furholz et al. | |
| 2006/0086834 A1 | 4/2006 | Pfeffer et al. | |
| 2007/0026531 A1 | 2/2007 | Mattigod et al. | |
| 2007/0053846 A1 | 3/2007 | Dave et al. | |
| 2007/0231249 A1 | 10/2007 | Batllo | |
| 2008/0085412 A1 | 4/2008 | Ortiz | |

FOREIGN PATENT DOCUMENTS

| | | |
|---|---|---|
| GB | 1587236 | 4/1981 |
| WO | 98/34723 A2 | 8/1998 |
| WO | 00/56450 A1 | 9/2000 |

OTHER PUBLICATIONS

Iler, Ralph K., "Chemistry of Silica: Solubility, Polymerization, Colloid, and Surface Properties, and Biochemistry," 1979, Wiley, pp. 5, 154, 155, 462, and 549.
Martellaro et al., "Environmental Application of Mineral Sulfides for Removal of Gas-Phase Hg(0) and Aqueous Hg2+," Separation Science and Technology, vol. 36, pp. 1183-1196, 2001.
Peterson et al., "Nanoscale Metal Sulfides for Mercury Sorption," (abstact only), Abstracts of Papers, 235th ACS National Meeting, New Orleans, LA, Apr. 6-10, 2008.
Moore et al., "Mercury-Sorption Characteristics of Nanoscale Metal Sulfides," (abstract only), Studies in Surface Science and Catalysis (2000), 129 (Nanoporous Materials II, Proceedings of the Conference on Access in Nanoporous Materials, 2000), pp. 765-772.
Hunkeler et al., "Mechanism, Kinetics and Modeling of the Inverse-Microsuspension Homopolymerization of Acrylamide," Polymer, vol. 30, pp. 127-142, 1989.
Hunkeler et al., "Mechanism, Kinetics and Modeling of the Inverse-Microsuspension Polymerization: 2. Copolymerization of Acrylamide with Quaternary Ammonium Cationic Monomers," Polymer, vol. 32, pp. 2626-2640, 1991.

* cited by examiner

*Primary Examiner* — Anthony J Green
(74) *Attorney, Agent, or Firm* — Andrew D. Sorensen; Edward O. Yonter

(57) ABSTRACT

A silica-containing composition is disclosed. The composition comprises a compound having the following formula: $(SiO_2)_x(OH)_yM_zS_a$F.B. M comprises at least one metal or metalloid cation S is a sulfur-based species. F optionally exists and F is at least one of the following: a functionalized organosilane, a sulfur-containing organosilane, an amine-containing organosilane, and an alkyl-containing organosilane at a surface area coverage of about 0.01 to about 100%. The molar ratio of y/x is equal to about 0.01 to about 0.5, the molar ratio of x/z is equal to about 0.5 to about 300 or from about 0.5 to about 100, and the molar ratio of a/z is about 0.5 to about 5. B is a hygroscopic solid at a water to solid molar ratio of 0.1-6 and preferably comprises at least one alkaline earth oxide or lanthanide oxide.

15 Claims, No Drawings

SULFUR CONTAINING SILICA PARTICLE

CROSS REFERENCE TO RELATED APPLICATIONS

This is a continuation in part application of U.S. patent application Ser. No. 12/756,577, "Sulfur Containing Silica Particle," filed on Apr. 8, 2010, now U.S. Pat. No. 8,025,726, and a continuation in part of U.S. patent application Ser. No. 12/756,526, "Silica Particle Manufacturing Process," filed on Apr. 8, 2010, each of which is incorporated herein by reference in their entirety.

FIELD OF THE INVENTION

This invention disclosure pertains generally to a silica-containing composition, and more specifically to a silica-containing composition that includes a sulfur moiety. The invention has particular relevance to silica-containing compositions that are dried on a hygroscopic solid and that further include a metal or metalloid cation and an optional organosilane moiety.

BACKGROUND OF THE INVENTION

Silica-containing materials have ubiquitous applications. More specifically, a variety of manufacturing processes that produce either consumer or industrial products utilize silica-containing, materials for various purposes. For example, silica-containing products can be utilized as fillers in coatings (e.g. paints) and polymer composites, catalysts supports, beer/wine/juice clarifiers. New and improved silica-containing products with increased performance and ease of use are desired by various industries.

SUMMARY OF THE INVENTION

The present invention accordingly provides for a composition comprising a compound having the following formula $(SiO_2)_x(OH)_yM_zS_a F.B$: wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following; sulfide salts, dithiocarhamates, polymer-based dithiocarbatuates, and polysulfide salts; wherein F optionally exists and said F is at least one of the following: a functionalized organosilane, a sulfur-containing organosilane, an amine-containing organosilane, and an alkyl-containing organosilane at a surface area coverage of about 0.01 to about 100%; and wherein the molar ratio of y/x is equal to about 0.01 to about 0.5, the molar ratio of x/z. is equal to about 0.5 to about 300 or from about 0.5 to about 100, and the molar ratio of EVZ is about 0.5 to about 5. In embodiments, B is a hygroscopic solid at a preferred water solid molar ratio of about 0.1 to about 6.

The present invention also provides for a composition comprising a compound having a formula of $(SiO_2)_{15}(OH)_x.Cu_1S_5.bCa(OH)_2$, where x is the surface concentration of hydroxyl species as determined by the moisture content and b is the relative amount of hydrated lime.

The present invention further provides for a product produced by filtering an aqueous-based material from a composition comprising a compound having the following formula $(SiO_2)_x(OH)_yM_zS_aF$ wherein M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein. S is a sulfur-based species selected from at least one of the following: sulfide salts, dithiocarbamates, polymer-based dithiocarbamates, and polysulfide salts; wherein F optionally exists and said F is at least one of the following; a functionalized organosilane, a sulfur-containing, organosilane, an amine-containing organosilane, and an alkyl-containing organosilane at a surface area coverage of about 0.01-100%; wherein the molar ratio of y/x is equal to about 0.01 to about 0.5, the molar ratio of x/z is equal to about 0.5 to about 300 or from about 0.5 to about 100, and the molar ratio of a/z is about 0.5 to about 5; and wherein the compound comprises about 3% to about 15% by weight in an aqueous-based material.

The present invention also provides for a product produced from drying a composition at a temperature of about 100° C. to about 350° C., wherein said composition comprises a compound containing the following formula $(SiO_2)_x(OH)_yM_zS_aF.B$: wherein M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected. from at least one of the following; sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of about 0.01 to about 100%; and wherein the molar ratio of y/x is equal to about 0.01 to about 0.5, the molar ratio of x/z is equal to about 0.5 to about 300 or from about 0.5 to about 100, and the molar ratio of a/z is about 0.5 to about 5.

The present invention also provides for a product produced by the addition of an aqueous-based composition to a hygroscopic solid such that the aqueous portion is adsorbed by the solid to form a hydrated product. The composition comprises a compound containing the following formula $(SiO_2)_x(OH)_yM_zS_aF.B$. M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of about 0.01 to about 100%; wherein the molar ratio of y/x is equal to about 0.01 to about 0.5, the molar ratio of x/z is equal to about 0.5 to about 300 or from about 0.5 to about 100, and the molar ratio of a/z is about 0.5 to about 5. B comprises a hygroscopic solid at a water to solid molar ratio of about 0.1 to about 6 and B comprises at least one alkaline earth oxide or lanthanide oxide.

The present invention provides for a method of forming a silica-containing product/composition. comprising: a. providing a silica-containing precursor (SCP) contained in solution that has a pH less than or equal to a pH of about 7; b. optionally doping the SCP with one or more metal species, wherein said doping occurs when the solution has a pH less than or equal to a pH of about 7; c. adjusting the pH of the solution to greater than about 7; d. adding an effective amount of salt to the solution so that the conductivity of the solution is greater than or equal to about 4 mS, wherein said addition occurs prior to, simultaneous with, or after the pH adjustment in step 1c; e. optionally filtering and drying the SCP; f. optionally reacting the dried product from step e with a functional group and optionally wherein the resultant functionalized dried product is at least one of the following: a functionalized metal oxide-doped or met al sulfide-doped silica-containing product; and g. adding the aqueous-based SCP to a hygroscopic solid such that the resulting product comprises a metal oxide-doped or metal sulfide-doped silica-containing product deposited on a hydrated alkaline earth oxide or lanthanide oxide substrate.

The present invention also provides for a method of forming a silica-containing product/composition comprising: a. providing a silica-containing precursor (SCP) contained in solution that has a pH greater than 7; b. adjusting the pH of the solution to less than or equal to about 7; c. optionally doping the SCP with one or more metal species, wherein said doping occurs when the solution has a pH less than or equal to a pH of about 7; d. adjusting the pH of the solution to greater than about 7; e. adding an effective amount of salt to the solution so that the conductivity of the solution is greater than or equal to about 4 mS, wherein said addition occurs prior to, simultaneous with, or after the pH adjustment in step 2d; f. optionally filtering and drying the SCP; g. optionally reacting the dried product from step f with a functional group and optionally wherein the resultant functionalized dried product is at least one of the following: a functionalized metal oxide-doped or metal sulfide-doped silica-containing product; and h. adding the aqueous-based SCP to a hygroscopic solid such that the resulting product comprises a metal oxide-doped or metal sulfide-doped silica-containing product deposited on a hydrated alkaline earth oxide or lanthanide oxide substrate.

DETAILED DESCRIPTION OF THE INVENTION

As specified above, the present invention provides a composition that contains a compound with a sulfur component, specifically a compound having a formula of $(SiO_2)_x(OH)_yM_zS_aF.B$: wherein M is selected from at least one of the following metal or metalloid cations: boron, magnesium, aluminum, calcium, titanium, vanadium, manganese, iron, cobalt, nickel, copper, zinc, zirconium, molybdenum, palladium, silver, cadmium., tin, platinum, gold, and bismuth; wherein S is a sulfur-based species selected from at least one of the following: sulfide salts, dithiocarbamates, and polymer-based dithiocarbamates, polysulfide salts; wherein F optionally exists and said F is at least one of the following: a functionalized organosilane, a organosilane, an amine-containing organosilane, and an alkyl-containing organosilane at a surface area coverage of about 0.01 to about 100% wherein the molar ratio of y/x is equal to about 0.01 to about 0.5, the molar ratio of x/z is equal to about 0.5 to about 300 or from about 0.5 to about 100, and the molar ratio of a/z is about 0.5 to about 5. in embodiments, B is a hygroscopic solid at a water solid molar ratio of about 0.1 to about 6 and comprises at least one alkaline earth metal oxide or lanthanide oxide.

Examples of hygroscopic solids (e.g., anhydrous inorganic hygroscopic solids) that can be used in this invention include, but are not limited to, alkali oxides, alkaline earth oxides, lanthanide oxides, the like, and combinations thereof Specific examples include calcium magnesium sulfate, ammonium sulfate, alkali hydroxides, the like, and combinations thereof. It should be appreciated that one skilled in the art would recognize that the effective amount of solid, needed to reach the desired dryness will vary dependent on the solid of choice. In embodiments, the hygroscopic inorganic, solid is at least one alkaline earth oxide or lanthanide oxide. Specific examples used herein arc intended to encompass such variations.

The compound can be in various forms and proportions relative to the components of the compositions. In addition, various products can contain the compounds encompassed by this invention. For example, the following compound embodiments can stand alone, be further modified by chemical and/or physical means, or integrated into other products (e.g., consumer or industrial products).

In another embodiment, the invention also provides for a composition comprising a compound having a formula of $(SiO_2)_{15}(OH)_y.Cu_1S_5$, where y is the surface concentration of hydroxyl species as determined by moisture content.

In another embodiment, the invention also provides for a composition comprising a compound having a formula of: $(SiO_2)_{15}(OH)_y.Cu_1S_5.bCa(OH)_2$ wherein y is a surface concentration of hydroxyl species as determined by the moisture content, and b is a relative amount of hydrated lime.

In another embodiment, the compound comprises about 3% to about 15% by weight in an aqueous-based slurry.

In another embodiment, the compound comprises about 15% to about 40% by weight in a wet cake form.

In another embodiment, the compound comprises about 40% to about 99% by weight in a powder form. In embodiments, the compound comprises about 60% to about 99% by weight in a powder form.

In another embodiment, the compound has a particle size of about 5 to about 200 μm containing aggregated nanoparticles ranging from about 3 to about 500 nm, in embodiments, the compound has a particle size of about 5 to about 500 μm containing aggregated nanoparticles ranging from about 3 to about 500 nm.

In another embodiment, the compound has a surface area of about 30 m²/g to about m²/g. In embodiments, the compound has a surface area of about 2 m²/g to about 200 m²/g.

In another embodiment, the compound has a pore volume of about 0.3 cc/g to about 2.0 cc/g. In embodiments, the compound has a pore volume of about 0.01 cc/g to about 1.0 cc/g.

In another embodiment, a product is produced by filtering an aqueous-based material from a composition comprising a compound having the following formula $(SiO_2)_x(OH)_yM_zS_aF$ wherein M is selected from at least one of the following: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarhamates, polymer-based dithiocarhamates, and polysulfide salts; wherein F optionally exists and said F is at least one of the following: a functionalized organosilane, a sulfur-containing organosilane, an amine-containing organosilane, and an alkyl-containing organosilane at a surface area coverage of about 0.01 to about 100%; wherein the molar ratio of y/x is equal to about 0.01 to about 0.5, the molar ratio of x/z is equal to about 0.5 to about 300 or from about 0.5 to about 100, and the molar ratio of a/z is about 0.5 to about 5; and wherein the compound comprises about 3% to about 15% by weight in an aqueous-based material.

In another embodiment, the product is produced from drying a composition at a temperature of about 100° C. to about 350° C., wherein said composition comprises a compound having the following formula $(SiO_2)_x(OH)_yM_zS_aF$: wherein M is at least one of the following metal or metalloid cations:

boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts, dithiocarbamates, polymer-based dithiocarbamates, and polysulfide salts; wherein F optionally exists and said F is at least one of the following: a functionalized organosilane, a sulfur-containing organosilane, an amine-containing organosilane, and an alkyl-containing organosilane at a surface area coverage of about 0.01 to about 100%; and wherein the molar ratio of y/x is equal to about 0.01 to about 0.5, the molar ratio of x/z is equal to about 0.5 to about 300 or from about 0.5 to about 100, and the molar ratio of a/z is about 0.5 to about 5.

In another embodiment, the product is produced by the addition of an aqueous-based composition to a hygroscopic solid such that the aqueous portion is adsorbed by the solid to form a hydrated product, wherein said composition comprises a compound containing the following formula $(SiO_2)_x(OH)_yM_zS_a$.F.B. M is selected from at least one of the following metal or metalloid cations boron, magnesium, aluminum, calcium, titanium, vanadium, manganese, iron, cobalt, nickel, copper, zinc, zirconium, molybdenum, palladium, silver, cadmium, tin, platinum, gold, and bismuth. S is a sulfur-based species selected front at least one of the following; sulfide salts, dithiocarbamates, polymer-based dithiocarbamates, and polysulfide salts and F optionally exists and comprises at least one of the following: a functionalized organosilane, a sulfur-containing organosilane, an amine-containing organosilane, and an alkyl-containing organosilane at a surface area coverage of about 0.01 to about 100%; wherein the molar ratio of y/x is equal to about 0.01 to about 0.5, the molar ratio of x/z is equal to about 0.5 to about 300 or from about 0.5 to about 100, and the molar ratio of a/z is about 0.5 to about 5; and wherein B comprises a hygroscopic solid at a water to solid molar ratio of about 0.1 to about 6 and is at least one alkaline earth oxide or lanthanide oxide.

The compounds can be made in various ways, such as U.S. Patent Application Publication No. 2007/0231249, which is herein incorporated by reference.

As stated above, the silica-containing products encompassed by this invention can be made by the Miming methods.

One methodology involves starting from an acidic starting point.

In one embodiment, the method comprises forming a silica-containing product comprising the steps of: a. providing a silica-containing precursor (SCP) contained in solution that has a pH less than or equal to a pH of 7; b. optionally doping the SCP with one or more metal species, wherein said doping occurs when the solution has a pH less than or equal to a pH of 7; c. adjusting the pH of the solution to greater than 7; d. adding an effective amount of salt to the solution so that the conductivity of the solution is greater than or equal to 4 mS, wherein said addition occurs prior to, simultaneous with, or after the pH adjustment in step 1c; e. optionally filtering and drying the SCP; f. optionally reacting the dried product from step e with a functional group and optionally wherein the resultant functionalized dried product is at least one of the following; a functionalized metal oxide-doped or metal sulfide-doped silica-containing product; and g. adding the aqueous-based SCP to a hygroscopic solid such that the resulting product comprises a metal oxide-doped or metal sulfide-doped silica-containing product deposited on a hydrated alkaline earth oxide or lanthanide oxide substrate. In another embodiment, the functional group in step f is an organosilane.

In another embodiment, the silicon-containing precursor is selected from at least one of the following: silicic acid, colloidal silica, tetracthylorthosilicate, and dispersed fumed silica.

In another embodiment, the pH range of the SUP in step 1(a) is from about 3 to about 4.

In another embodiment, the pH of the SCP is adjusted to greater than 7 by mixing/interacting the molecules of said SCP with an alkaline solution at a shear rate of 6 to 23 m/s based on tip speed.

In another embodiment, the method further comprises adjusting the pH of the SCP to greater than about 7 by mixing said SCP with an alkaline solution via a mixing chamber. It should be appreciated that any suitable mixing device or chamber may be used in the method of the invention. An, example of a mixing chamber is described in U.S. Pat. No. 7,550,060, "Method and Arrangement for Feeding Chemicals into a Process Stream." In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then he attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can he utilized.

It is envisioned that any suitable reactor or mixing device/chamber may be utilized in the method of the invention.

In another embodiment, the method further comprises adjusting the pH of the SCP to greater than about 7 by combining said SCP with an alkaline solution with mixing yielding a Reynolds Number greater than or equal to 2,000 to form the silica-containing product.

In another embodiment, the method further comprises adjusting the pH of the SCP to greater than about 7 by combining said SCP with an alkaline solution under transitional flow conditions (i.e., Reynolds Numbers between 2,000 and 4,000) to form die silica-containing product.

In another embodiment, the method further comprises adjusting the pH of the SCP to greater than about 7 by combining said SCP with an alkaline solution under turbulent flow conditions (i.e., Reynolds Numbers greater than or equal to 4,000) to form the silica-containing product.

In another embodiment, the of the SCP is adjusted to a pH range of about 7 to about 11 with the use of a chemistry selected from at least one of the following; ammonium hydroxide, ammonium carbonate, mineral bases such as but not limited to sodium hydroxide and/or potassium hydroxide, organic bases such as but not limited to trimethylammonium hydroxide, alkaline silicates, sulfide salts such as but not limited to sodium sulfide, and polysulfide containing salts such as but not limited to calcium polysulfide and/or sodium polysulfide.

In another embodiment, the resulting slurry from step d is filtered and dried such that the solid concentration of said dried and filtered product is increased from about 5 wt % to about 99 wt %.

In another embodiment, the dried product from step e is surface treated with an organosilane via controlled hydrolysis and condensation of the silane to the silica surface in at least one of the processes: an organic solvent, supercritical solvent, or solvent-free process.

In embodiments, the aqueous-based SCP is added to a hygroscopic inorganic solid in a fluidized bed mixer such that the water is adsorbed uniformly by the solid to form a hydrated powder containing the SCP.

Another methodology involves starting from an alkaline starting point.

In one embodiment, the method comprises forming a silica-containing product comprising the steps of: a. providing a silica-containing precursor (SCP) contained in solution that has a pH greater than about 7; b. adjusting the pH of the solution to less than or equal to about 7; c. optionally doping the SCP with one or more metal species, wherein said doping occurs when the solution has a pH less than or equal to a pH of about 7; d. adjusting the pH of the solution to greater than about 7; e. adding an effective amount of salt to the solution so that the conductivity of the solution is greater than or equal to about 4 mS, wherein said addition occurs prior to, simultaneous with, or after the pH adjustment in step 2d; f. optionally filtering and drying the SCP; g. optionally reacting the dried product from step f with a functional group and optionally wherein the resultant functionalized dried product is at least one of the following: functionalized metal oxide-doped or metal sulfide-doped silica-containing product; adding the aqueous-based SCP to a hygroscopic solid such that the resulting product comprises a metal oxide-doped or metal sulfide-doped silica-containing product deposited on a hydrated alkaline earth oxide or lanthanide oxide substrate.

In another embodiment, the functional group in step g is an organosilane.

In another embodiment, the silicon-containing precursor is selected from at least one of the following: silicic acid, colloidal silica, alkaline silicates, tetraethylorthosilicate, and dispersed fumed silica.

In another embodiment, the pH of the silicon-containing precursor is adjusted through the use of at least one of the following: carbonic acid, an organic acid(s) such as but not limited to acetic acid, a mineral acid(s) such as but not limited to sulfuric acid and/or hydrochloric acid such that the pH is decreased to a range of from to about 2 to about 7.

In another embodiment, the pH range of the SCP is adjusted to a range of about 3 to about 4 with acetic acid.

In another embodiment, the pH of the SCP is adjusted to a pH range of about 7 to about 11 with the use of a chemistry selected from at least one of the following: ammonium hydroxide, ammonium carbonate, mineral bases, organic bases, alkaline salts, sulfide salts, alkaline silicates, and polysulfide containing salts.

In another embodiment, the resulting slurry from step e is filtered and dried such that the solid concentration of said dried and filtered product is increased from about 5 wt % to about 99 wt %.

In another embodiment the dried product from step f is surface treated with an organosilane via controlled hydrolysis and condensation of the silane to the surface of the SCP in at least one of the following: an organic solvent, supercritical solvent, or solvent-free process.

In another embodiment, the pH of the SCP is adjusted to greater than about 7 by mixing said SCP with an alkaline solution at a shear rate of about 6 to about 23 m/s based on tip speed.

In another embodiment, the method further comprises adjusting the pH of the SCP to greater than about 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product, in one embodiment, said mixing chamber can then he attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized. It is envisioned that any suitable reactor or mixing device/chamber may be utilized in the method of the invention.

In another embodiment, the method further comprises adjusting the pH of the SCP to greater than about 7 by combining said SCP with an alkaline solution with mixing yielding a Reynolds Number greater than or equal to 2,000, to form the silica-containing product.

In another embodiment, the method further comprises adjusting the pH of the SCP to greater than about 7 by combining said SCP with an alkaline solution under transitional flow conditions (i.e., Reynolds Numbers between 2,000 and 4,000) to form the silica-containing product.

In another embodiment, the method further comprises adjusting the pH of the SCP to greater than about 7 by combining said SCP with an alkaline solution under turbulent flow conditions (i.e., Reynolds Numbers greater than or equal to 4,000) to form the silica-containing product. The sulfur-based species of the present invention may be selected from a representative list but not intended to be a limiting list of at least one of the following: sulfide salts, dithiocarbamates, polymer-based dithiocarbamates, and polysulfide salts. Sulfide salts maybe but not limited to sodium sulfide, potassium sulfide, and/or metal sulfides such as copper sulfide. Dithiocarbamates may be but not limited to dimethyldithiocarbamate (DMDTC) or diethyielithiocarbamate (DEDTC). Polymer-based dithiocarbamates contain organic polymers containing the functional group $R_nCS_2$, wherein R is an alkyl group which is linear or branched. An example of a commercially available polymer-based dithiocarbamate is described in U.S. Pat. Nos. 5,164,095 and 5,346,627, which are herein incorporated by reference. Polysulfides that can he used in the present invention include, but are not limited to, sodium polysulfide and calcium polysulfide.

Organosilanes that can be used in the current invention are well known in the art and may he represented generally by $R_{(4-a)}$—$SiX_a$, wherein a may he from 1 to 3. The organofunctional group, R—, may be any aliphatic or alkene containing functionalized group such as propyl, butyl, 3-chloropropyl, amine, thiol, and combinations thereof. X is representative of a hydrolysable alkoxy group, typically methoxy or ethoxy. Some examples are 3-thiopropyl and mercaptopropyl silanes.

During the preparation of the composition of this invention, salt is added to increase the conductivity of the reaction solution to 4 mS. Examples of the salts that can be used include, but are not limited to, alkali and alkaline halides, sulfates, phosphates, and nitrates such as sodium sulfite, potassium chloride, sodium chloride, sodium nitrate, calcium sulfate, and potassium phosphate. One skilled in the art would recognize that the effective amount of salt added to reach the desired conductivity will vary dependent on the salt of choice.

Thiols and amines are represented generally by the class of organic and inorganic compounds containing the amine or thiol group having the general formula —B—(SH) or —B—(NH$_2$), wherein B is a linear or branched group consisting of carbon atoms such as —(CH$_2$)$_n$—, wherein a is from 1 to 15, in particular where n is 1 to 6, and most preferred where a is 3.

EXAMPLE 1

In this example, 2.180 g of 7 wt % silicic acid was added to a heel containing 450 g deionized (DI) water and 150 g of silicic acid heated to 90° C. The silicic acid was fed at 10 ml/min for 3 h via a peristaltic pump into a 5 L reaction flask.

A solution containing 16.4 g of a 25 wt % ammonia solution and 5.84 g ammonium carbonate was prepared in 24.6 g DI water. The solution was added to the reaction flask quickly whereupon the viscosity of the solution increased significantly. The mixture was stirred for 30 minutes, then any remaining silicic acid was fed at 20 ml/min. Upon completion of the silicic acid feed, the heating was turned off and the solution was allowed to cool.

The silica slurry was filtered and freeze-dried at 150° C. to produce a dry powder. Nitrogen sorption analysis of the powder was performed on an Autosorb-1C unit from Quantachrome. The sample was degassed at 300° C. for 2 h, then characterized by a multi-point BET (Brunauer, Emmett, and Teller—a surface area test) surface area, total pore volume, and BJH (Barrett-Soyner-Halenda) adsorption pore size distribution. Physical data indicated a surface area of 354 square meters per gram, a pore volume of 1.19 cc/g, and a pore diameter of 13.5 nm.

EXAMPLE 2

In this example, 1414 g of 8.3 wt % silicic acid was added to a heel containing 16.3 g copper sulfate, 400 g DI water, and 200 g silicic acid heated to 90° C. The silicic acid was fed at ml/min for 3 h via a peristaltic pump into a 5 L reaction flask.

A solution containing 17.3 g sodium sulfide and 1.1.8 g of a 25 wt % ammonia was prepared in 200 g DI water. The solution was quickly added to the reaction flask after 3 h of silicic acid feed where the viscosity of the solution increased significantly. The mixture was stirred for 30 minutes, then any remaining silicic acid was fed at 16 ml/min. Upon completion of the silicic acid feed, the heating was turned off and the solution was allowed to cool.

The CuS-doped silica slurry was filtered and dried at 105° C. to produce a dry powder. Nitrogen sorption analysis of the powder was performed on an Autosorb-1C unit from Quantachrome. The sample was degassed at 105° C. for 4 h, then characterized by a multi-point BET surface area, total pore volume, and BJH adsorption pore size distribution. Nitrogen sorption analysis indicated a surface area of 321 square meters per gram, a pore volume of 1.46 cc/g, and a pore diameter of 18.2 nm.

EXAMPLE 3

In this example, three solutions were prepared: A) 12 kg Nalco N8691 silica sol, B) 396 g copper sulfate and 360 g glacial acetic acid dissolved in 5.24 kg DI water, and C) 1.1 kg calcium polysulfide solution and 900 g 25 wt % ammonia dissolved in 16 kg DI water. Solution B was added to solution A, followed by subsequent addition of solution C at a high shear rate. The mixture was stirred for 1-2 minutes before filtration. Nalco N8691 can he obtained from Nalco Company, 1601 West Diehl Road, Naperville, Ill. 60563.

The CuS-doped silica slurry was filtered and flash-dried at 565° F. to produce a dry powder. Nitrogen sorption analysis of the powder was performed on an Autosorb-IC unit from Quantachrome. The sample was degassed at 105° C. for 4 h, then characterized by a multi-point BET surface area, total pore volume, and BJH adsorption pore size distribution. Nitrogen sorption analysis indicated a surface area of 227 square meters per gram, a pore volume of 0.45 cc/g, and a pore diameter of 7.9 nm.

EXAMPLE 4

In this example, three solutions are prepared: A) 2 kg Nalco N8691 silica sol, B) 53.2 g ferric sulfate and 60 a glacial acetic acid dissolved in 887 g DI water, and C) 184 g calcium polysulfide solution and 150 g 25 wt % ammonia dissolved in 2667 g DI water. Solution B is added to solution A, followed by subsequent addition of solution C at a high shear rate. The mixture is stirred for 1-2 minutes before filtration. The iron sulfide-doped silica slurry is then filtered and flash-dried at 565° F. to produce a dry powder.

EXAMPLE 5

In this example, three solutions were prepared: A) 100 g Nalco N8691 silica sot (available from Nalco Company, Naperville, Ill.), B) 0.5 g copper sulfate and 3 g glacial acetic, acid dissolved in 61.8 g DI water, and C) 1.38 g calcium polysulfide solution and 7.5 g 25 wt % ammonia dissolved in 53.2 g DI water. Solution B was added to solution A, followed by subsequent addition of solution C at a high shear rate. After mixing, 215 g of DI water was added at a high shear rate. The mixture was stirred for 1-2 minutes, 36.9 g of aqueous slurry was sprayed onto 56.1 g of CaO with a spray bottle while stirring in a round bottom flask.

Nitrogen sorption analysis of the powder was performed on an Autosorb-1C unit from Quantachrome. The sample was degassed at 150° C. for 6 h, then characterized by a multi-point BET surface area, total pore volume, and BJH adsorption pore size distribution. Nitrogen sorption analysis indicated a surface area of 227 square meters per gram, a pore volume of 0.45 cc/g, and a pore diameter of 7.9 nm. TGA analysis of the powder indicated 23 wt % mass loss due to moisture.

EXAMPLE 6

In this example, three solutions were prepared: A) 100 g Nalco N8691 silica sol, B) 3.32 g copper sulfate and 3 g glacial acetic acid dissolved in 55.1 g DI water, and C) 9.2 g calcium polysulfide solution and 7.5 g 25 wt % ammonia dissolved in 145.2 g DI water. Solution B was added to solution A, followed by subsequent addition of solution C at a high shear rate. After mixing, 300 g of DI water was added at a high shear rate. The mixture was stirred for 1-2 minutes. 38.6 g of aqueous slurry was sprayed onto 56.1 g of CaO with a spray bottle while stirring in a round bottom flask.

Nitrogen sorption analysis of the powder was performed on an Autosorb-1C unit from Quantachrome. The sample was degassed at 150° C. for 6 h, then characterized by a multipoint BET surface area, total pore volume, and BJH adsorption pore size distribution. Nitrogen sorption analysis indicated a surface area of 227 square meters per gram, a pore volume of 0.45 cc/g, and a pore diameter of 7.9 nm. TGA analysis of the powder indicated 8.7 wt % mass loss due to moisture.

EXAMPLE 7

In this example, three solutions were prepared: A) 25 g Nalco N8691 silica sol, B) 12.45 g copper sulfate and 3 g glacial acetic acid dissolved in 200 g DI water, and C) 39.5 g calcium polysulfide solution and 7.5 g 25 wt % ammonia dissolved in 200 g DI water. Solution B was added to solution A, followed by subsequent addition of solution C at a high shear rate. After mixing, 425 g of DI water was added at a high shear rate. The mixture was stirred for 1-2 minutes. 37.6 g of aqueous slurry was sprayed onto 56.1 g of CaO with a spray bottle while stirring in a round bottom flask.

Nitrogen sorption analysis of the powder was performed on an Autosorb-1C unit from Quantachrome. The sample was degassed at 150° C. for 6 h, then characterized by a multipoint BET surface area, total pore volume, and BJH adsorption pore size distribution. Nitrogen sorption analysis indicated a surface area of 20.4 square meters per gram, a pore volume of 0.18 cc/g, and a pore diameter of 34.7 nm. TGA analysis of the powder indicated 3.8 wt % mass loss due to moisture.

EXAMPLE 8

In this example, three solutions are prepared: A) 500 g Nalco N8691 silica sol B) 16.6 g copper sulfate and 15 g glacial acetic acid dissolved in 218 g DI water, and C) 46 g calcium polysulfide solution and 37.5 g 25 wt % ammonia dissolved in 667 a Di water. Solution B was added to solution A, followed by subsequent addition of solution C at a high shear rate. After mixing, 1.5 kg of DI water was added at a high shear rate. The mixture was stirred for 1-2 minutes. 2.3 kg of aqueous slurry was sprayed onto 3.5 kg of CaO in a Littleford-Day plow mixer.

Combinations of Components Described in Patent Application

In one embodiment, the composition of matter claims include various combinations of sorbent components and associated compositions, such molar ratios of constituent particles. In a further embodiment, the claimed compositions include combinations of the dependent claims. In a further embodiment, a range or equivalent thereof of a particular component shall include the individual component(s) within the range or ranges within the range.

In another embodiment, the method of use claims include various combinations of the sorbent components and associated compositions, such molar ratios of constituent particles. In a further embodiment, the claimed methods of use include combinations of the dependent claims. in a further embodiment, a range or equivalent thereof of a particular component shall include the individual component(s) within the range or ranges within the range.

In another embodiment, the method of manufacture claims include various combinations of the sorbent components and associated compositions, such pH control. In a further embodiment, the claimed methods of use include combinations of the dependent claims. In a further embodiment, a range or equivalent thereof of a particular component shall include the individual component(s) within the range or ranges within the range.

All of the compositions and methods disclosed and claimed herein can be made and executed without undue experimentation in light of the present disclosure. While this invention, may be embodied in many different forms, there are described in detail herein specific preferred embodiments of the invention. The present disclosure is an exemplification of the principles of the invention and is not intended to limit the invention to the particular embodiments illustrated. in addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A composition comprising a compound having the following formula: $(SiO_2)_x(OH)_yM_zS_a.F.B$:
    wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; S is a sulfur-based species selected from at least one of the following: sulfide salts, dithiocarbamates, polymer-based dithiocarbamates, and polysulfide salts; F optionally exists and said F is at least one of the following: a functionalized organosilane, a sulfur-containing organosilane, an amine-containing organosilane; and an alkyl-containing organosilane at a surface area coverage of about 0.01 to about 100% B is a hygroscopic solid selected from the group consisting of alkali oxides, alkaline earth oxides, lanthanide oxides, and combinations thereof; and wherein the molar ratio of y/x is equal to about 0.01 to about 0.5, the molar ratio of x/z is equal to about 0.5 to about 300, and the molar ratio of a/z is about 0.5 to about 5.

2. The composition of claim 1, further comprising an aqueous-based slurry wherein the compound comprises about 3% to about 15% by weight in the aqueous-based slurry.

3. The composition of claim 1, further comprising a wet cake form wherein the compound comprises about 15% to about 40% by weight in the wet cake form.

4. The composition of claim 1, further comprising a powder form and wherein the compound comprises about 40% to about 99% by weight in the powder form.

5. The composition of claim 1, wherein the compound has a particle size of about 5 to about 500 μm containing aggregated nanoparticles ranging from about 3 to about 500 nm.

6. The composition of claim 1, wherein the compound has a surface area of about 30 $m^2$/g to about 800 $m^2$/g.

7. The composition of claim 1, wherein the compound has a surface area of about 2 $m^2$/g to about 200 $m^2$/g.

8. The composition of claim 1, wherein the compound has a pore volume of about 0.01 cc/g to about 1 cc/g.

9. The composition of claim 1, further comprising a compound having the following formula: $(SiO_2)_{15}(OH)_y \cdot Cu_1S_5$.

10. The composition of claim 1, wherein B comprises a water solid molar ratio of about 0.1 to about 6.

11. The composition of claim 1, further comprising a compound having the following formula: $(SiO_2)_{15}(OH)_y \cdot Cu_1S_5 \cdot bCa(OH)_2$, wherein y is the surface concentration of hydroxyl species as determined by moisture content, and b is a relative amount of hydrated lime.

12. The composition of claim 1, wherein the molar ratio of x/z is equal to about 0.5 to about 100.

13. A product produced by filtering an aqueous-based material comprising the composition of claim 1, the product comprising from about 3 wt % to about 15 wt % in the aqueous-based material.

14. A product produced from drying the composition of claim 1 at a temperature of about 100 °C. to about 350 °C.

15. A composition comprising a compound having the following formula: $(SiO_2)_{15}(OH)_y \cdot Cu_1S_5$, wherein S is a sulfur-based species selected from at least one of the following:
sulfur, sulfide salts, dithiocarbamates, polymer-based dithiocarbamates, and polysulfide salts and y is a relative surface concentration of hydroxyl species as determined by residual moisture content.

* * * * *